United States Patent
Cruey

[19]

[11] Patent Number: 5,937,483
[45] Date of Patent: Aug. 17, 1999

[54] ENVELOPING HINGE SYSTEM AND METHOD

[76] Inventor: Jim O. Cruey, 713 E. First St., Richlands, Va. 24641

[21] Appl. No.: 08/995,323

[22] Filed: Dec. 22, 1997

[51] Int. Cl.⁶ .................................................. E05D 15/00
[52] U.S. Cl. ............................................. 16/368; 16/366
[58] Field of Search .......................... 16/368, 369, 370, 16/389, 366, 225; 403/54, 53, 119; 220/4.22, 533, 521, 523, 619, 620; 206/315.11, 315.1, 373; 43/57.1

[56] References Cited

U.S. PATENT DOCUMENTS

| | | | |
|---|---|---|---|
| D. 246,071 | 10/1977 | Landell et al. ......................... D87/1 R |
| D. 339,228 | 9/1993 | Moos et al. ................................. D3/38 |
| D. 361,659 | 8/1995 | Kahl et al. ................................ D3/260 |
| 1,554,161 | 9/1925 | Hubbard .................................... 16/368 |
| 1,635,462 | 7/1927 | Cummings ................................ 16/366 |
| 2,917,216 | 12/1959 | Despres .................................... 206/373 |
| 3,367,062 | 2/1968 | Glass ........................................ 43/57.1 |
| 3,986,656 | 10/1976 | November ................................ 229/15 |
| 4,023,304 | 5/1977 | Singer ...................................... 43/54.5 |
| 4,471,573 | 9/1984 | Voges ...................................... 206/373 |
| 4,570,437 | 2/1986 | Moritz ...................................... 16/266 |
| 4,799,590 | 1/1989 | Furman .................................... 206/390 |
| 4,827,658 | 5/1989 | Wolniak ................................... 43/54.1 |
| 4,951,812 | 8/1990 | Chen ........................................ 206/373 |
| 5,156,289 | 10/1992 | Goof ........................................ 206/373 |
| 5,370,453 | 12/1994 | Wolff ....................................... 312/217 |
| 5,379,906 | 1/1995 | Levin et al. ............................. 211/195 |
| 5,439,108 | 8/1995 | Lackie ..................................... 206/373 |

*Primary Examiner*—Chuck Y. Mah

[57] ABSTRACT

An enveloping hinge system and method for use on storage boxes, fishing tackle boxes, tool boxes and the like is disclosed. The enveloping hinge system and method comprise four identical links, each with a male end and a female end. Each said end is provided with a pivot point for joining to the next link, as well as providing a rotational axis on the order of 90°. When open, the invention generally provides a flat surface for which to access the contents of said storage box. When closed, the invention generally provides a closed shape in which the bottom surface of each storage unit provides an outer surface of a 360° shape to allow for storage and transportation requirements.

2 Claims, 6 Drawing Sheets

ENVELOPING HINGE SYSTEM AND METHOD

BACKGROUND OF THE INVENTION

1. Field of the Invention

The present invention relates generally to hinge systems and, more particularly, to an enveloping hinge system and method used on storage boxes and the like.

2. Description of the Related Art

In the related art, numerous attempts have been made to improve the functionality and versatility of hinge systems used on storage boxes, fishing tackle boxes and the like. These improvements have ranged from hinged-lid compartmentalized boxes to folding and/or collapsing inserts for existing containers and the like. The previous art consists of several devices in which hinges are depicted that allow the user of a storage box increased versatility and functionality. These devices, however, have one or more of the following problems:

First, the devices can be complex, and therefore, expensive to manufacture. The public is less likely to purchase such a device.

Second, such devices are generally limited to top access, thereby requiring stacking of the contents within the device.

Third, the top access only configuration makes no use of the space formed between the lid and the storage structure, thereby wasting storage space.

A search of the prior art did not disclose any patents that read directly on the claims of the instant invention; however, several references in the prior art were considered related:

U.S. Pat. No. 5,439,108, issued in the name of Lackie, discloses a compartmentalized tool box. However, this design consists merely of a box with a hinged lid that contains a plurality of stacked trays therein. This system is unduly burdensome and complicated in the sense that the user may be required to remove every tray in order to retrieve the article he desires and replace all of the trays when finished.

U.S. Pat. No. 4,827,658, issued in the name of Singer, discloses a compartmentalized fishing tackle box equipped with a plurality of vertically aligned tubular storage compartments. This design is impractical in the sense that only items small in size can be stored in the tubes and their retrieval will be extremely difficult. Furthermore, much storage space is wasted in the area in between the tubular compartments.

U.S. Pat. No. 4,023,304, issued in the name of Singer, discloses a compartmentalized fishing tackle box equipped with a plurality of small, vertically aligned rectangular compartments, a large compartment and a compartmentalized storage drawer. While this design incorporates a more efficient use of space than the '108 patent in the sense that the smaller compartments pose the same size restrictions and retrieval problems as discussed in the '108 patent. Furthermore, the complexity of the design is of an extremely high degree due to the multitude of compartments, dividers, doors and drawers along with the channels, fasteners and hinges required for assembly.

U.S. Pat. No. 5,370,453, issued in the name of Wolff, discloses a compartmentalized jewelry box equipped with a plurality of vertically aligned drawers and two larger storage compartments. This design is also inefficient in the sense that it wastes storage space due to unaccessible space within the structure. Additionally, the jewelry box is not designed to be portable and therefore detours significantly from the intent of the present invention.

U.S. Pat. No. 3,986,656, issued in the name of November, and U.S. Pat. No. 5,379,906, issued in the name of Levin et al., disclose collapsible, foldable organizers designed for placement in automobile trunks and the like wherein the trunk is compartmentalized by the use of vertical dividing members placed within the trunk. In light of the present design, these inventions suffer from shortcomings. First, the devices provide no portable means of transporting their contents other than the fact that they are placed in a motor vehicle. Second, the contents are by no means protected or retained within the structure due to the fact that there exists no lid or covering structure.

Consequently, a need has therefore been felt for an improved but less complex mechanism that allows for an enveloping hinge system and method.

SUMMARY OF THE INVENTION

It is therefore an object of the present invention to provide an improved enveloping hinge system and method.

It is therefore another object of the present invention to provide for an improved enveloping hinge system and method that allows for its use on storage boxes, fishing tackle boxes, ice coolers, toolboxes and the like.

It is yet another object of the present invention to provide for an improved enveloping hinge system and method that utilizes symmetrical, interchangeable components for construction of the hinge system.

It is yet another object of the present invention to provide for an improved enveloping hinge system and method that is easily understood and utilized by the common user.

Briefly described according to the preferred embodiment of the present invention, the invention is an enveloping hinge system and method for use on storage boxes, fishing tackle boxes, tool boxes and the like. The enveloping hinge system and method comprise four identical links, each with a male and a female end. Each said end is provided with a pivot point for joining to the next link, as well as providing a rotational axis on the order of 90°. When open, the invention generally provides a flat surface for which to access the contents of said storage box. When closed, the invention generally provides a closed shape in which the bottom surface of each storage unit provides an outer surface of a 360° shape to allow for storage and transportation requirements.

An advantage of the present invention is that it is readily scalable during manufacture to provide storage solutions of many sizes. Small versions would see such uses as sewing kits, small part storage boxes and the like. Large versions would see such uses as power tool storage boxes, ice coolers and the like.

Another advantage of the present invention is that it is simple, and therefore, inexpensive to manufacture. This savings, if passed on to the consumer, may influence the public to utilize such a device. A simple design also increases product reliability and useful product lifetime.

Another advantage of the present invention is that it provides a storage solution that is compact and collapsible, thus lending itself to being easily stored in a closet or other storage space when not in use.

Another advantage of the present invention is that its segmented design allows for the use of one storage solution to serve various functions. A user may use one segment of the invention for a sewing kit, while another section of the same storage unit is used as a toolbox. Such use conserves natural resources and decreases consumer cost in that one storage unit can be used in a variety of situations.

Another advantage of the present invention is that it is easily produced from readily available materials using a variety of known manufacturing techniques, thus allowing for an economical and aesthetically pleasing product available in a wide range of colors and finishes.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
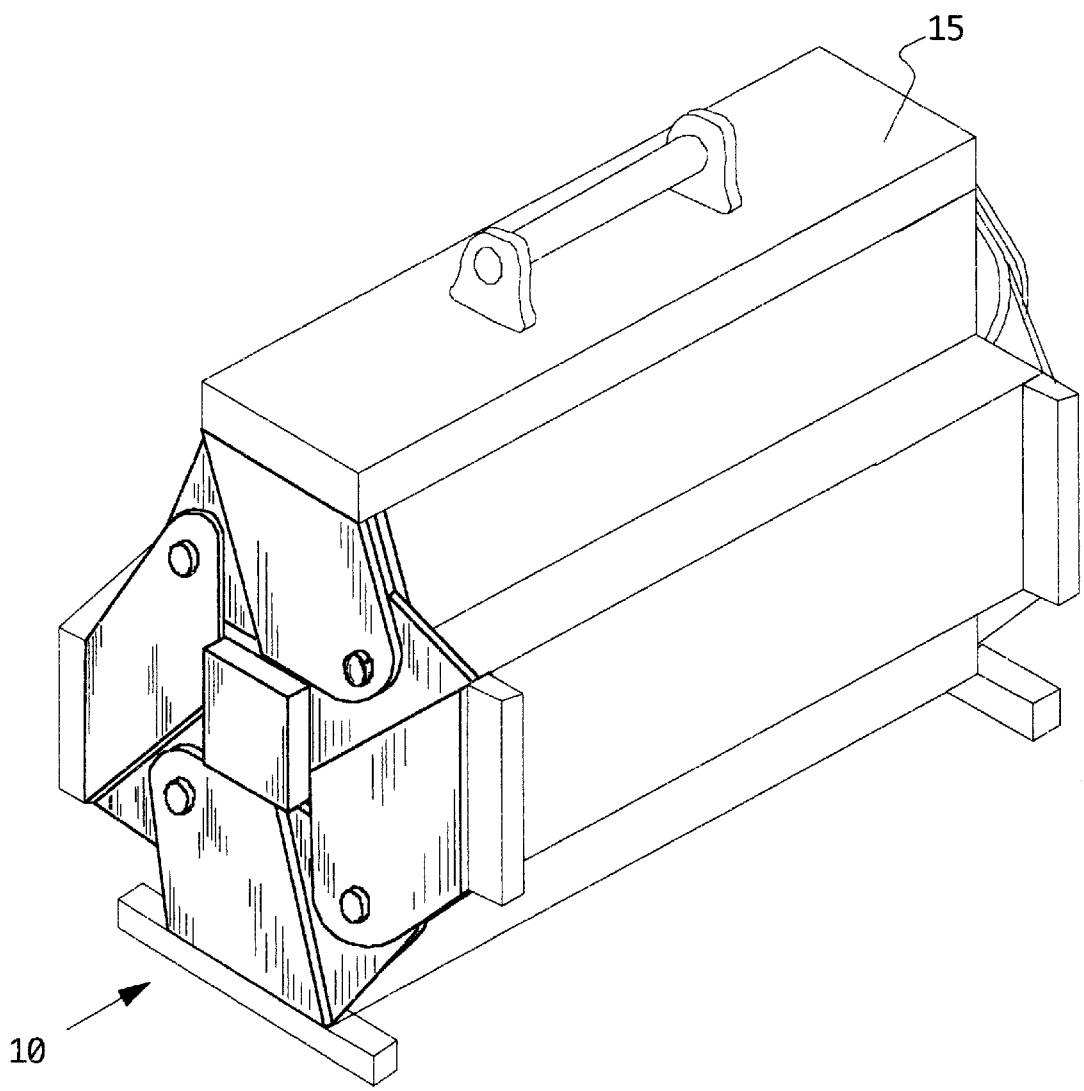
FIG. 1 is a perspective view of the enveloping hinge system and method shown in a utilized state on a general purpose storage box according to the preferred embodiment of the present invention.

Referring now to FIG. 1, a perspective view of an enveloping hinge system and method 10 is shown in a utilized state on a general purpose storage means 15, such as a multi compartment box, according to the preferred embodiment of the present invention. The general purpose storage means 15 as depicted is a multi compartment box such as would be found on a fishing tackle box or a sewing kit box. It should be noted however, that the depiction is not intended to be limiting. It is envisioned that the general purpose storage means 15 could as easily be a large toolbox, an ice cooler, a first aid box and the like. The size, as well as any design of any general purpose storage means 15 can easily be accommodated by increasing the size of the enveloping hinge system and method 10 accordingly. The material of manufacture of the enveloping hinge system and method 10 is envisioned to match, as well as be an integral part of the general purpose storage means 15. Possible manufacturing materials include but are not limited to metal, wood, plastic, fiberglass and the like. Final use of the general purpose storage means 15 will contribute to the manufacturing material decision. It should be noted that the opposing end of the general purpose storage means 15 is equipped with an identical enveloping hinge system and method 10. All types of storage means will be equipped with an enveloping hinge system and method 10 at each end.

Figure 2:
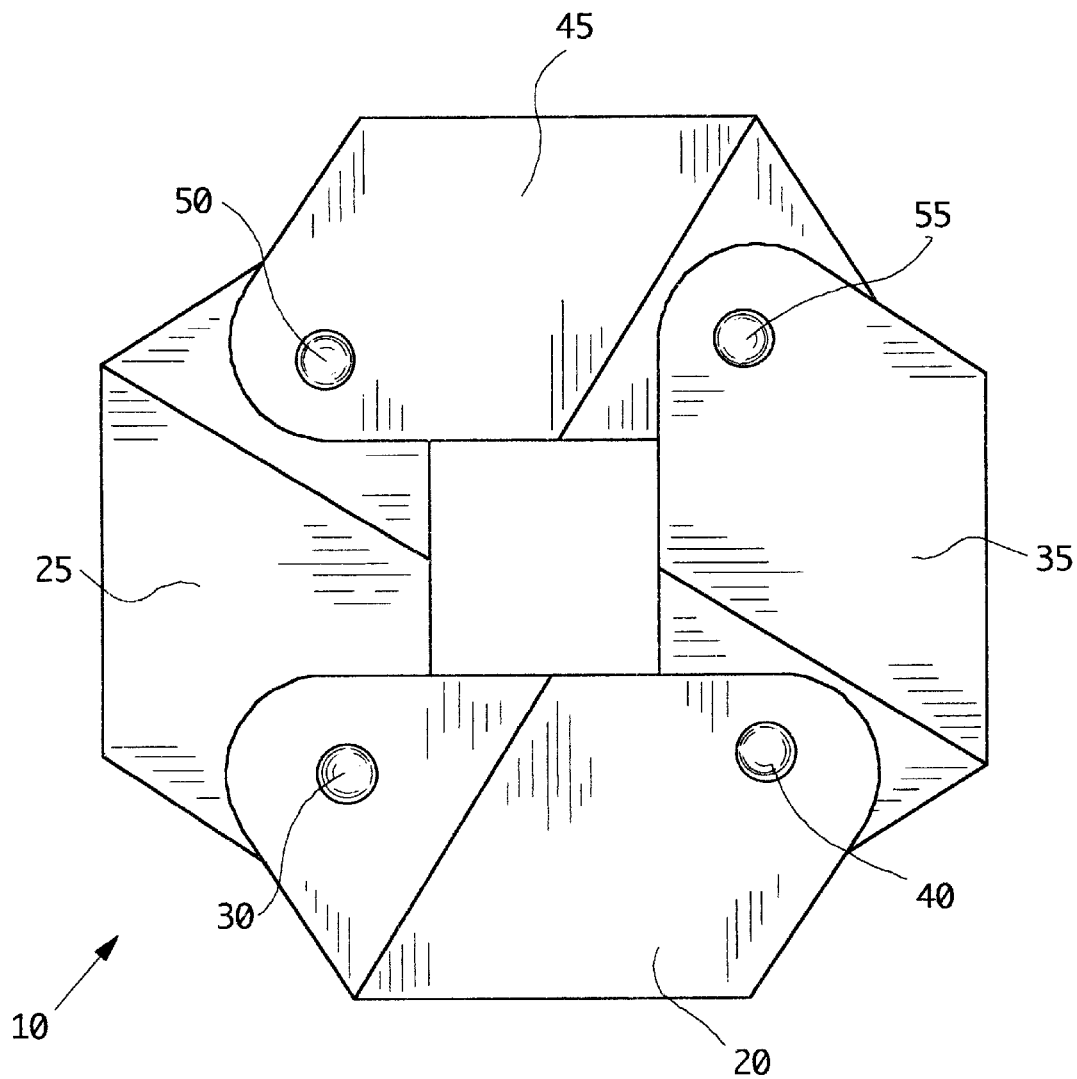
FIG. 2 is an elevation view of the enveloping hinge system and method in a closed state.

Referring next to FIG. 2, an elevation view of the enveloping hinge system and method 10 shown in a closed state is depicted. A base link 20 is provided which is connected to a first side link 25 via a first rotational pin 30 and a second side link 35 via a second rotational pin 40. Also connected to the first side link 25 is a top link 45 via a third rotational pin 50. The top link 45 is secured to the second side link 35 via a latching means 55, such as a pin. The latching means 55 is of a removable nature and can take the shape of many forms. It is envisioned that the latching means 55 could be a pin, a screw, spring return pin, a locking bar or any means which couples the top link 45 to the second side link 35 via physical restraining force. All links rotate about their respective neighboring pins to a maximum of 900 with respect to one another. The mechanism about which they rotate will be described in greater detail hereinbelow.

Figure 3:
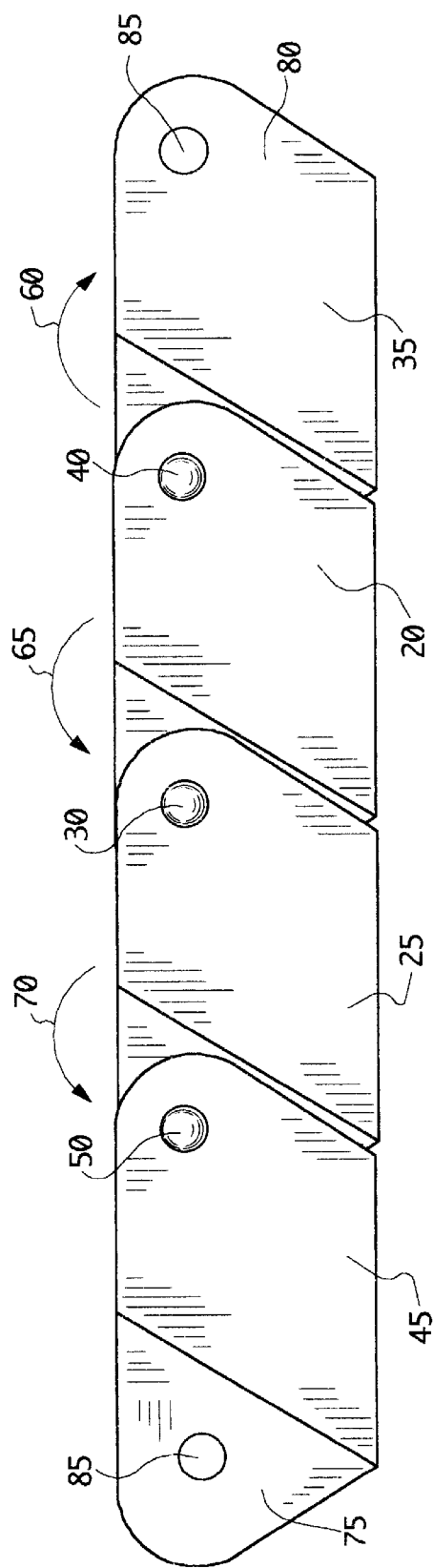
FIG. 3 is an elevation view of the enveloping hinge system and method in an open state.

Referring now to FIG. 3, an elevation view of the enveloping hinge system and method in an open state is disclosed. The base link 20 remains in its orientation as depicted in FIG. 2. The second side link 35 is rotated about the second rotational pin 40 as shown by a first directional arrow 60. The first side link 25 is rotated away from the base link 20 via the first rotational pin 30 as depicted by a second directional arrow 65. Finally, the top link 45 is rotated away from the first side link 25 around the third rotational pin 50 as depicted by a third directional arrow 70. The latching means 55(not shown in this FIG.) has been removed from the male surface 75 of the top link 45 and likewise from the female surface 80 of the second side link 35. This action exposes a rotational locking alignment receptacle 85 in both the male surface 75 and the female surface 80, and allows for such rotational action as aforementioned described to commence. It should be noted that any compartments of the general purpose storage means 15(not shown in this FIG.) attached to the first side link 25 or the second side link 35 will be rotated 90° with respect to their position as shown in FIG. 2. Additionally, any compartment attached to the top link 45 will be rotated 180° with respect to its position as shown in FIG. 2. This rotational alignment will be considered when placing any required access covers on said compartments.

Figure 4:
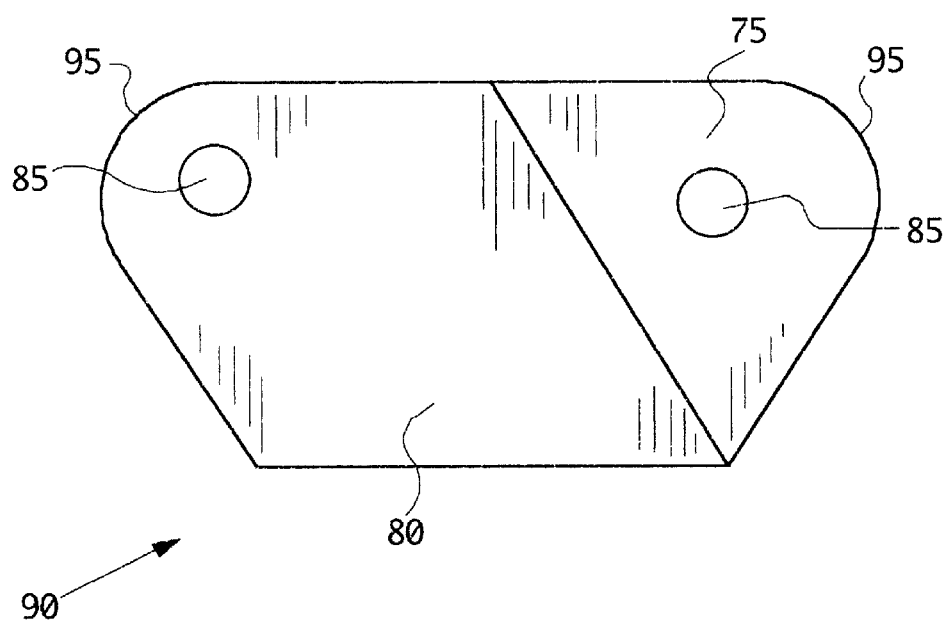
FIG. 4 is a front elevation view of the link as used with the enveloping hinge system and method.

Referring next to FIG. 4, a front elevation view of a link segment 90 as used with the enveloping hinge system and method 10 is depicted. The link segment 90 is general in nature with the following detailed explanation directly applicable to the base link 20, the first side link 25, the second side link 35 and the top link 45. The link segment 90 is composed of the male surface 75 placed in direct physical contact and centrally arranged between two female surface 80 (only one of which is visible in FIG.). The pair of rotational locking alignment receptacles 85 are located at the center point of a radius defining a lower rounded edge 95 of both the male surface 75 and the female surface 80. The rotational locking alignment receptacle 85 passes through the entire plane defining the male surface 75 as well both entire planes of the female surface 80. The thickness of the male surface 75 is such that it can be inserted in between the space as defined by both of the female surface 80, as will be seen in greater detail hereinbelow. The link segment 90 is depicted herein and below as possessing separate components. While this may be the case depending on materials of construction and design methods, it is also intended that the link segment 90 may be formed as one continuous item with features and appendages discussed herein.

Figure 5A:
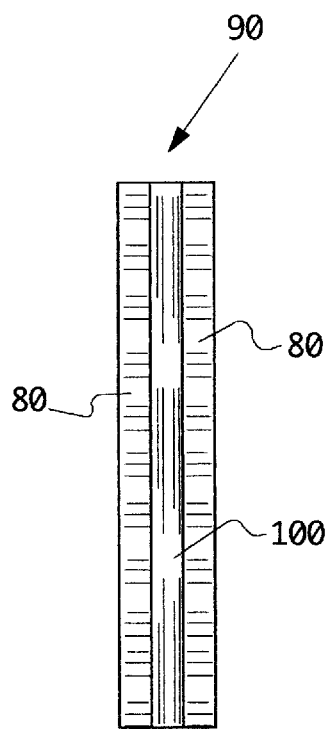
FIG. 5a is a left side elevation view of the link as used with the enveloping hinge system and method.

Referring now to FIG. 5a, a left side elevation view of the link segment 90 is disclosed. A reception cavity 100 is shown between the two female surface 80 to provide for the reception of the male surface 75 (not shown in this FIG.) as aforementioned described.

Figure 5B:
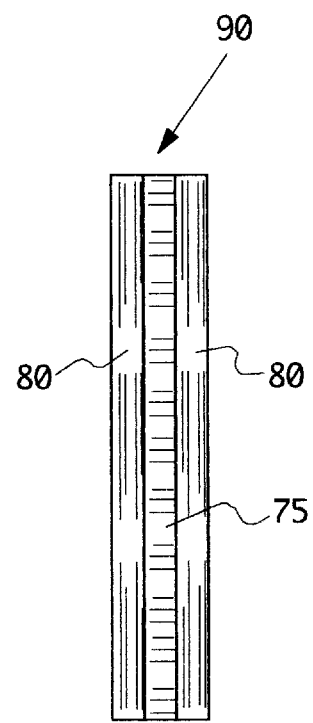
FIG. 5b is a right side elevation view of the link as used with the enveloping hinge system and method.

Referring next to FIG. 5b, a right side elevation view of the link segment 90 is disclosed. The male surface 75 is clearly shown as extending from the two female surface 80 as aforementioned described.

Figure 6A:
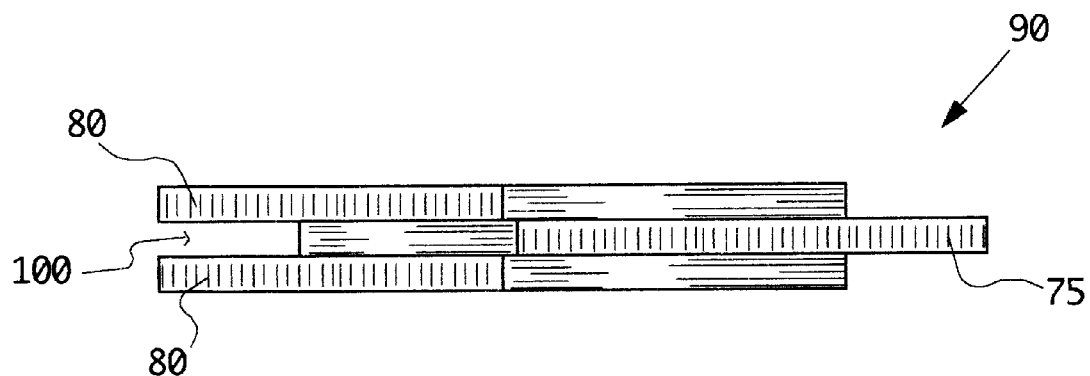
FIG. 6a is a top plan view of the link as used with the enveloping hinge system and o.

Referring now to FIG. 6a, a top plan view of the link segment 90 is disclosed. This figure further clarifies the reception cavity 100 formed by the joining of the two female surface 80 with a male surface 75 centrally located as shown.

Figure 6B:
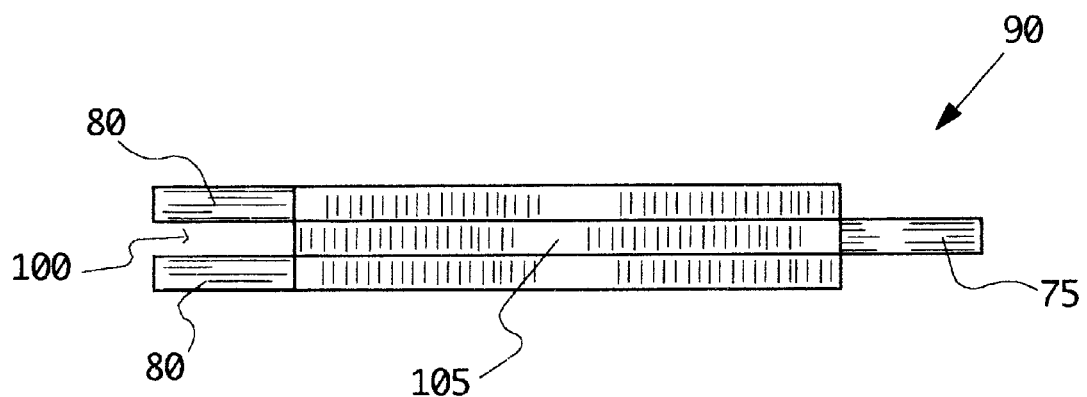
FIG. 6b is a bottom plan view of the link as used with the enveloping hinge system and method.

Referring finally to FIG. 6b, a bottom plan view of the link segment 90 as used with the enveloping hinge system and method 10 (not shown in this FIG.) is depicted. This FIG. once again clarifies the reception cavity 100 formed by the joining of the two female surface 80 with a male surface 75 centrally located as shown. Also, a flat mounting surface 105 is formed and provided by the common flush juncture of the male surface 75 with the two female surface 80. The flat mounting surface 105 is available to be used as a mounting point for any applicable surfaces of the general purpose storage means 15(not shown in this FIG.)

2. Operation of the Preferred Embodiment

In operation, the present invention can be easily utilized by the common user in a simple and effortless manner. To use the present invention with its preferred embodiment can best be described in conjunction with the perspective views of FIG. 1, the elevational views of FIG. 2, FIG. 3, FIG.4, FIG. 5a, and FIG. 5b, and the plan views of FIG. 6a and FIG. 6b.

The user would first remove the general purpose storage means 15 equipped with an enveloping hinge system and method 10 at each end from its storage location, and place it on a horizontal surface to allow ease of access. Next the user would release the latching means 55 from the rotational locking alignment receptacle 85 on the second side link 35 and the top link 45. The user is now enabled to rotate the top link 45 from the first side link 25 about the third rotational pin 50. If further access into the general purpose storage means 15 is required, the user would rotate the first side link 25 from the base link 20 about the first rotational pin 30 and the second side link 35 from the base link 20 about the second rotational pin 40. At this point the user has complete access to all areas and compartments inside the general purpose storage means 15. After the user is completed with the tasks associated with the general purpose storage means 15 and enveloping hinge system and method 10, the user would reverse the above described sequence to secure the general purpose storage means 15 and place it back in its storage location.

The foregoing description is included to illustrate the operation of the preferred embodiment and is not meant to limit the scope of the invention. The scope of the invention is to be limited only by the following claims.

What is claimed is:

1. An enveloping hinge system comprising:

a base link;

a first side link, said first side link connected to said base link via a first rotational pin;

a second side link, said second side link connected to said base link via a second rotational pin;

a top link, said top link connected to said first side link via a third rotational pin, and wherein said top link is secured to said second side link via a latching means;

said latching means being of a removable nature for latching said second side link to said top link;

and whereby all said links rotate about their respective neighboring pins to a maximum of 90° with respect to one another;

and wherein each said base link, side link, and top link is comprised of two female surfaces separated by and forming a reception cavity and having a male surface placed in direct physical contact and centrally arranged between said two female surfaces, the thickness of the male surface being such that it can be inserted within said reception cavity; and wherein a pair of rotational locking alignment receptacles are located at the center point of said female surfaces.

2. A general purpose storage means utilizing an enveloping hinge system, wherein said storage means comprises a multi compartment box having at least two opposing ends, and wherein each said end comprises:

a base link;

a first side link, said first side link connected to said base link via a first rotational pin;

a second side link, said second side link connected to said base link via a second rotational pin;

a top link, said top link connected to said first side link via a third rotational pin, and wherein said top link is secured to said second side link via a latching means;

said latching means being of a removable nature for latching said second side link to said top link;

and wherein each said base link, side link, and top link is comprised of two female surfaces separated by and forming a reception cavity and having a male surface placed in direct physical contact and centrally arranged between said two female surfaces, the thickness of the male surface being such that it can be inserted within said reception cavity; and wherein a pair of rotational locking alignment receptacles are located at the center point of said female surfaces.

* * * * *